United States Patent [19]
Chacon

[11] 3,814,987
[45] June 4, 1974

[54] OVERVOLTAGE PROTECTION CIRCUIT

[75] Inventor: Manuel Frank Chacon, Mequon, Wis.

[73] Assignee: Johnson Service Company, Milwaukee, Wis.

[22] Filed: Dec. 21, 1972

[21] Appl. No.: 317,290

[52] U.S. Cl. .................. 317/16, 317/27 R, 317/31, 317/33 SC, 317/33 VR, 317/33 C
[51] Int. Cl. ............................................. H02h 3/20
[58] Field of Search .......... 317/16, 31, 33 SC, 33 C, 317/46, 33 VR, 27 R; 307/61, 87

[56] References Cited
UNITED STATES PATENTS

| | | | |
|---|---|---|---|
| 3,360,685 | 12/1967 | Wooldridge | 317/5 |
| 3,600,634 | 8/1971 | Muench | 317/16 |
| 3,729,651 | 4/1973 | Fricker et al. | 317/16 |

*Primary Examiner*—James D. Trammell
*Attorney, Agent, or Firm*—Andrus, Sceales, Starke & Sawall

[57] ABSTRACT

A D.C. power supply generally includes a regulator to establish a selected output voltage, and an overvoltage protector circuit which protects the power supply loads in the event of a regulator malfunction.

This disclosure includes two overvoltage protection circuits which utilize like protective methods. An overvoltage protector for a single low voltage supply includes a programmable unijunction transistor with a gate reference obtained from the temperature compensated reference within the voltage regulator, and triggered by the overvoltage condition appearing between its anode and cathode terminals. As such, this circuit is a three input circuit consisting of external references, monitored input and common. An overvoltage protector for high voltage dual supplies includes a temperature stable silicon unilateral switch that monitors part of the protected output and is triggered by an increase of that stabled voltage beyond the breakdown voltage of the device itself. As such, this circuit is a two input circuit requiring connection to monitored input and common. In both applications, low or high voltage, the voltage sensitive device triggers one or two silicon controlled rectifiers located across the monitored voltage outputs, thereby causing them to short out and to actuate the power supply's respective current responsive safety devices.

12 Claims, 2 Drawing Figures

OVERVOLTAGE PROTECTION CIRCUIT

BACKGROUND OF THE INVENTION

The present invention relates to an overvoltage protection circuit and particularly to such circuit including a switching circuit responsive to an overvoltage condition to actuate a suitable current limiting means.

Direct current power supplies and the like are conventionally provided with overvoltage sensing means to remove the load in the event of selected overvoltage conditions. The removal should be relatively rapid in order to avoid costly equipment damage. A conventional protective method employs a clamping or crowbar circuit connected across the power supply with detection means to sense an overvoltage condition and establish an essential short circuit condition in response to selected overvoltages. A suitable disconnect means responds to the short circuit current condition to remove the load from the power source. Thus, an electronic current limiter or a fusible link are conventionally used to respond to the short circuit condition. D.C. power supplies or the like are operated within varying temperature environments. The sensing means should, therefore, be constructed to provide reliable and repeatable voltage sensing independent of the normal temperature variations.

Where a dual voltage supply is provided with respect to a common reference, the system preferably is constructed to clamp both voltages simultaneously in response to an overvoltage condition in either one or both of the monitored voltages.

The systems should also of course be relatively inexpensive when adapted to normal production methods.

SUMMARY OF THE INVENTION

The present invention is particularly directed to an overvoltage protection circuit employing an improved detection means. Generally, in accordance with the present invention, the low voltage power supply (of the order of 5 to 6 volts) includes a regulation means which establishes an additional reference voltage means as one input to the detection circuit. A voltage dividing network may be connected to the reference voltage and provides a detection lever reference independent of the supply output voltage. An electronic switching circuit such as a programmable unijunction transistor, or other similar three terminal unit, is connected to the reference and to the supply and together make a triggerable voltage comparator unit. The comparator unit should be temperature stable such that the response is essentially independent of the surrounding environmental temperature. The output or control terminal of the comparator unit is connected to trigger a gated switch such as a controlled rectifier means which is connected directly across the supply to be protected and defines a "crowbar" overvoltage protection circuit with corresponding actuation of current responsive means.

In particular, the circuit may employ a programmable unijunction transistor as part of the comparator with the gate thereof connected to the reference voltage dividing network. The output is connected to the gate of the controlled rectifier which is connected directly across the power supply. An increase in the power supply output voltage correspondingly increases the anode voltage, and at a level selected by the voltage divider located across the reference, the transistor will conduct and supply triggering current to the controlled rectifier. The latter then conducts, shorts the output of the protected source and results in the protective actuation of the current limiter or disconnect circuitry.

As applied to a high voltage (6 volts or higher) dual voltage supply, the overvoltage protector requires no external reference and may be connected directly across the voltage supply. A portion of the supply voltage is tapped off with a voltage divider and connected through a temperature stabilized switching element such as a silicon unilateral switch to the input of a solid state amplifying switch such as a controlled rectifier. The silicon unilateral switch is a three terminal element and may be connected with two terminals to the references supply and the output to the amplifier. The output of the controlled rectifier amplifier provides simultaneously actuation of suitable switch means connected across both of the dual voltage supplies to thereby simultaneously short circuit both of the associated supply outputs and actuate the electronic current limiters, fusible links or the like. Thus, whenever the differential supply voltage increases beyond to the present trigger point, the silicon unilateral switch breaks down and triggers the SCR amplifier thereby providing current to simultaneously fire the "crowbar" silicon controlled rectifiers connected between the respective positive and negative sources and ground.

Thus, a single overvoltage protection circuit provides for simultaneous protection of a dual voltage source by simultaneously actuating of both "crowbar" circuits in response to deviation of either voltage with respect to a selected reference. The silicon unilateral switch is a very temperature stable element and Applicant has found that the circuit will provide a repeatable trigger voltage condition even when subjected to temperature variations of twenty-five degrees centigrade or more with respect to the present reference temperature.

BRIEF DESCRIPTION OF DRAWING

The drawing furnished herewith illustrates preferred constructions of the present invention in which the above advantages and features are clearly disclosed as well as others which will be readily understood from the subsequent description of such embodiments.

In the drawing.

DESCRIPTION OF THE ILLUSTRATED EMBODIMENTS

Figure 1:
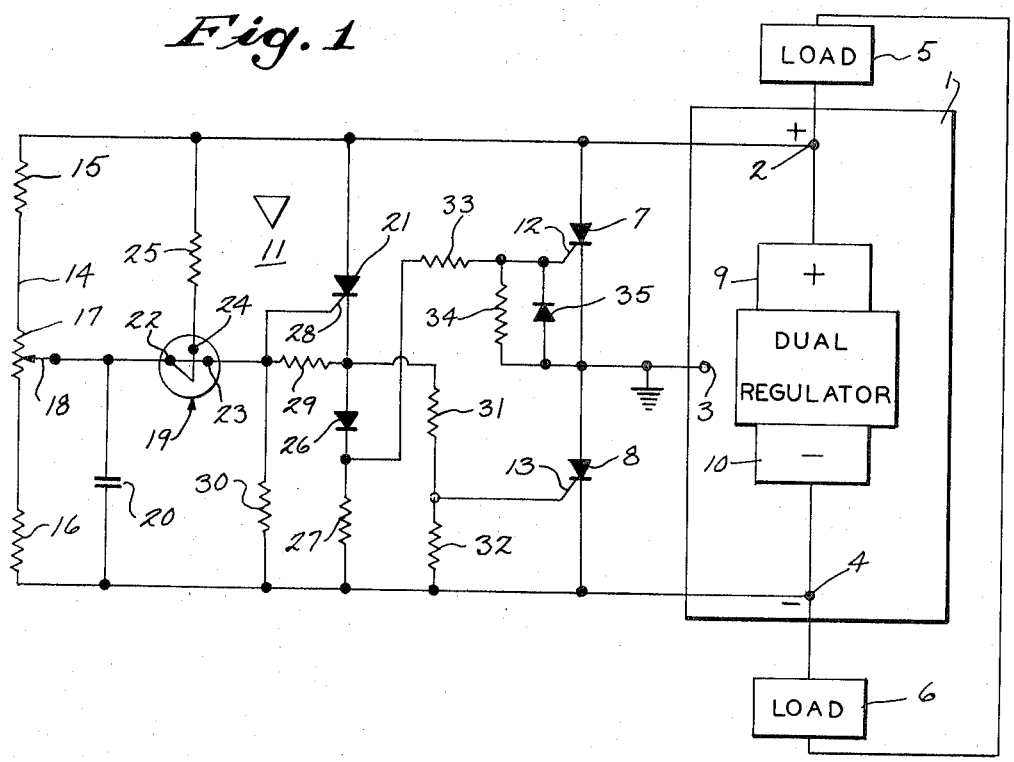
FIG. 1 is a schematic diagram of a dual voltage supply with a single overvoltage detection means for actuating individual crowbar circuits.

Referring to the drawing and particularly to FIG. 1, a DC (direct current) power source 1 is shown in block diagram having a positive output terminal 2 with respect to ground 3 and a negative output terminal 4 with respect to ground 3. The positive and negative power sides of the power source are connected to suitable load means 5 and 6 to provide corresponding power supply to the respective loads. In accordance with the present invention, separate silicon controlled rectifier 7 and 8 or other suitable solid state switching means are connected across the respective supplies with respect to ground and, when actuated, create an operative short circuit condition. This, in turn, actuates suitable current limit or fuse elements 9 and 10 to disconnect the supplies from the loads. A single overvoltage detection circuit 11 is connected directly across the output of the power source 1 to provide a single overvoltage detection circuit for simultaneously actuating of the controlled rectifiers 7 and 8. The overvoltage detection circuit 11 is connected across both power supply outputs and provides repeatable operation with varying temperature conditions. The overvoltage detection circuit 11 will detect an overvoltage condition in either or both of the monitored voltages and provide an essentially simultaneous clamp of both voltages in response to an overvoltage condition in either or both of the monitored voltages.

More particularly, each of the control rectifiers is a power unit and has its anode to cathode circuit similarly connected between the corresponding voltage sources 2 and 4 to ground. The gates 12 and 13 of the rectifiers 7 and 8 are connected to the detection circuit 11 and are simultaneously energized in response to the sensing of an overvoltage circuit condition.

The overvoltage detection circuit 11 includes a voltage dividing branch network 14 including a pair of fixed resistors 15 and 16 connected to the opposite sides of an adjustable or tapped resistor 17. The network 14 is connected in series directly across the regulated positive and the negative source connection or terminals 2 and 4. The tap 18 of resistor 17 provides a voltage signal related to any variation in either the positive or negative source voltage and thus provides a continuous monitoring of corresponding voltages. The tap 18 is connected as an input to a temperature stable three terminal comparator unit and in particular in a particularly novel construction to a silicon unilateral switch 19. A capacitor 20 is connected in parallel between the tap 18 and the negative terminal 4 and is thus charged to a voltage corresponding to the voltage at tap 18.

The unilateral switch is a known three terminal device connected to compare and monitor both voltages referenced to ground. The switch 19 includes an anode 22 and a cathode 23 connected respectively in series to the triggering network of the amplifier 21. A gate 24 of switch 19 is connected in series with a resistor 25 to the positive side of the power terminal or connection 2 of source 1. The unilateral switch 19 compares the voltage at terminal 4 and at tap 18. When this exceeds the device threshold voltage it conducts. Capacitor 20 is then discharged into the triggering network for a switching amplifier 21. The output of amplifier 21, in turn, simultaneously fires the rectifiers 7 and 8.

The switching amplifier 21 is shown as a controlled rectifier amplifier having the anode connected to the positive supply terminal 2 and the cathode connected in series with a diode 26 and a resistor 27 to the negative supply line or terminal 4. The gate 28 is connected directly to the cathode 23 of the unilateral transistor or switch 19. A bias resistor 29 is connected across the gate to cathode circuit of the rectifier 21. The gate 28 is also connected by a resistor 30 to the negative terminal 4. Thus, the capacitor 20 discharges through the resistor 30 in parallel with the resistor 29, diode 26 and resistor 27. The voltage developed across the resistor 29 is sufficient to drive the controlled rectifier 21 on, thereby establishing direct power supply to the circuit between the positive to the negative source. The turn on of rectifier 21 simultaneously establishes a current drive to the power control rectifiers 7 and 8 located across the respective power supplies or sources.

In particular the controlled rectifier 8 connected between the negative terminal 4 and ground 3 is fired from a pair of voltage dividing resistors 31 and 32 connected between the cathode of rectifier 21 and the negative supply. The junction of the resistors 31 and 32 is connected to the gate 13 of the controlled rectifier 8. Thus, when the switching amplifier 21 is turned on, sufficient voltage is developed across the resistor 32 to trigger the rectifier 8 on.

The controlled rectifier 7 is simultaneously triggered. Thus a pair of series connected resistors 33 and 34 are connected between the cathode side of the diode 26 and ground 3. The diode 26 isolates ground from the negative supply. Thus when the switching rectifier 21 turns on, current flow through the resistors 33 and 34 is sufficient to generate a turn on voltage to the rectifier 7. The gate 12 of the rectifier 7 is connected to the junction of the resistors 33 and 34 and the rectifier 7 is turned on when the voltage developed across resistor 34 rises to the triggering level. A protective diode 35 is connected across the gate to ground circuit to clamp any negative voltage applied to the gate 12.

Thus each of the power supplies will be individually clamped to ground. Further, each of the power supplies is provided with the suitable current limiting devices 9 and 10, such as an electronic current limiter, fusible link or the like. The overload protection for the current limiter is therefore shown in block diagram. The clamping of the output by the crowbar switches 7 and 8 results in a rapid increase in current flow from the power supply with the corresponding actuation of the devices 9 and 10.

Thus, in summary, the voltage from the respective power supplies is differentially monitored across the voltage dividing network branch 14. The portion of that voltage between the tap 18 of the centrally located resistor 17 and the negative input is continuously monitored by the unilateral switch 19. For example, in a practical construction, a trigger voltage of approximately 8 volts was selected. When the differential input voltage exceeds this preset trigger point, that is when the voltage difference applied to the gate and to the anode is eight volts, the switch 19 conducts and the capacitor 20 is discharged to, in sequence, fire the switching amplifier 21 and thereby essentially simultaneously fire the power switches 7 and 8, with the resulting actuation of the current limiters 9 and 10.

The circuit shown in FIG. 1 provides a temperature stable "crowbar" circuit employing a single overvoltage detection circuit responsive to deviations of either or both monitored voltages from a selected level to provide simultaneous clamping of both sources. The temperature stability provides repeatable trigger operation over normal temperature deviations encountered in environmental control systems and the like.

Figure 2:
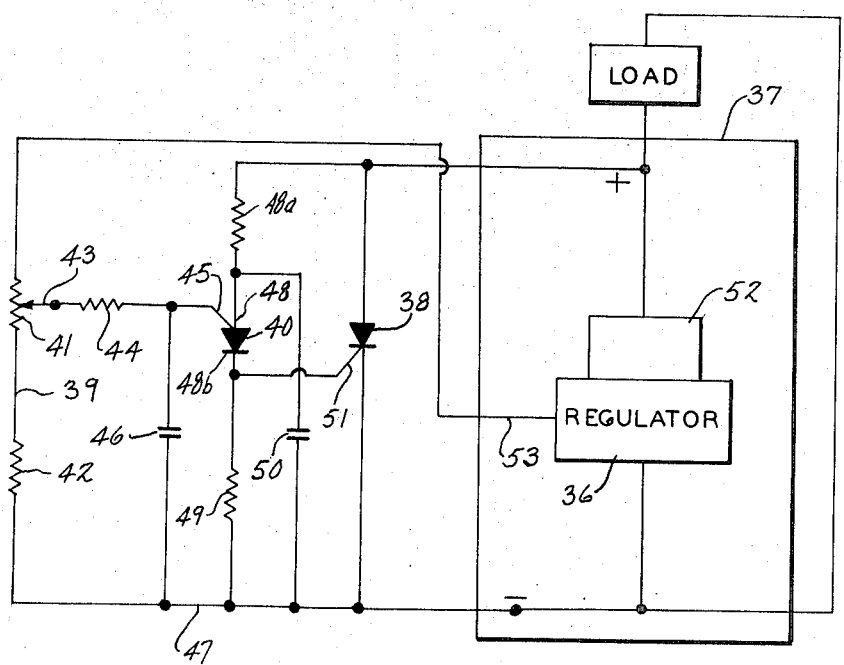
FIG. 2 is a schematic diagram of a single voltage power supply overvoltage protection circuit constructed in accordance with the present invention.

The invention is also applicable to a low voltage, single voltage supply (under 6 volts). Thus in FIG. 2, an alternative embodiment of the invention is shown applied to an overvoltage "crowbar" application employing a regulated voltage source 36 within the protected source 37. In the embodiment of FIG. 2, a silicon controlled rectifier 38 is connected across the voltage source 37 to be protected. A reference voltage branch 39 is connected to the reference regulated source 36 and is connected with the source to a programmable unijunction transistor 40, as a voltage comparator. The gate of the transistor 40 is connected to the reference voltage branch 39. If the magnitude of the protected voltage source rises to the level selected by the voltage reference branch 39, the programmable unijunction transistor 40 fires to establish a turn on signal to the clamping rectifier which, in turn, results in actuation of a suitable limiter.

More particularly, the reference voltage branch 39 is shown as a pair of resistors 41 and 42 connected to the reference of voltage source 36 over lines 53. In a practical application, the embodiment shown in FIG. 2 has been applied to protect against excessive overvoltage conditions in a 5 volt power supply having as a part hereof a U-723 Monolithic Regulator. A tap 43 of the resistor 41 allows set point adjustment and is connected in series with a resistor 44 to the gate 45 of the programmable unijunction transistor 40. A capacitor 46 is connected between the gate and reference or ground line 47 and is, of course, charged to a positive potential in the standby position. When the transistor is initially triggered the capacitor discharges to drive the transistor to the fully on state.

The anode 48 is connected to the positive supply in series with a limiting resistor 48a. Similarly, the cathode 48b is connected to the reference line in series with a resistor 49. A transient protection capacitor 50 may also be connected between the anode and the reference line.

The gate 51 of the power controlled rectifier 38 is connected to the cathode 48b of the programmable unijunction transistor 40. When the transistor 40 is driven on the voltage developed across the resistor 49 biases the rectifier 38 to conduct and short the power source 1 with the consequent actuation of the current limiting device 52 similar to the function described in connection with FIG. 1.

The programmable unijunction transistor 40 provides a three terminal voltage comparator again which, in conjunction with the temperature compensation voltage reference of the power supply 36, is very temperature stable and which will permit operation of the overload protector over normal temperature variations encountered in environmental control devices and the like.

Applicant has found that the circuit of FIG. 2 as applied to a 5 volt power supply provides a low cost overvoltage protector which is capable of maintaining a set point within 100 milivolts. This provides a very reliable means of protecting the low voltage power supply and the like.

The illustrated overvoltage protection device in this second embodiment shares the reference voltage with the D.C. power supply being protected and thereby simplifying and minimizing the expense.

Various modes of carrying out the invention are contemplated as being within the scope of the following claims, particularly pointing out and distinctly claiming the subject matter which is regarded as the invention.

I claim:

1. An overvoltage clamping circuit for protecting of a direct current power source means against abnormal voltage conditions comprising a temperature stable solid state three terminal voltage comparator having input terminals connected respectively to the power source, a reference voltage and ground and responsive to abnormal deviations of said power source voltage from a selected reference voltage and establishing a selected control signal at a control terminal only upon sensing an abnormal deviation, a solid state power switch connected across said direct current power source to define an essentially short circuit when conducting, and triggering circuit means connecting the control terminal of said voltage comparator to said controlled solid state power switch and responsive to a selected overvoltage condition to trigger said switch and establish said essentially short circuit condition.

2. The overvoltage clamping circuit of claim 1 including a current limit disconnect means connected to the direct current power source means and responsive to said essentially short circuit condition to open the power source means.

3. The overvoltage clamping circuit of claim 1 wherein said direct current power source means includes an internal voltage regulator and having a voltage dividing network connected to the reference voltage of the regulator, said solid state power switch being a controlled rectifier means.

4. The clamping circuit of claim 1 wherein said comparator is a programmable unijunction transistor having a main output circuit means connected directly across the gate of a power switch having an anode means connected to the direct current source means and a gate means connected to the reference voltage, said power switch having a control connected to the programmable unijunction transistor whereby an increase in the anode voltage over the gate reference voltage results in triggering of the unijunction transistor with a consequent turn-on of the power switch to establish an essentially short circuit across the output of the power source means.

5. The overvoltage clamping circuit of claim 1 for protection of a low voltage power source having an internal voltage regulator establishing a normal operating voltage, said solid state power switch being triggered by unidirectional conducting means connected directly across the low voltage power source, said switch having a triggering input gate, a voltage dividing network connected to said voltage regulator and having an adjustable resistance means to establish a reference voltage with respect to said operating voltage, said solid state three terminal voltage comparator including a programmable unijunction transistor having a main input circuit means connected across the power source through a gating resistor and having a gate means connected to the voltage dividing network, the input gate of said power switch being connected to the junction of said gating resistor and output of the programmable unijunction transistor.

6. The clamping circuit of claim 5 having a capacitor connected across said adjustable resistance, and a protecting capacitor connected across the unijunction transistor and said gating resistor.

7. The overvoltage clamping circuit of claim 1 for protection of a direct current regulated low voltage power source establishing a normal operating voltage wherein said solid state power switch is a controlled rectifier connected directly across the voltage power source, said switch having a triggering input gate, said voltage power source having an internal reference voltage means, a voltage dividing network connected to said reference voltage means to establish a reference voltage with respect to said operating voltage, said comparator including a programmable unijunction transistor having a main input circuit means connected across the voltage power source and having a gate means connected to the voltage dividing network, said power rectifier having its gate connected to the output terminal of the programmable unijunction transistor, the gate voltage on the unijunction transistor being above the voltage on the anode of the unijunction transistor with the operating voltage below a selected level, whereby an increase in the anode voltage over the gate reference voltage results in triggering of the unijunction transistor with a consequent firing of the power rectifier to establish said essentially short circuit across the output of the voltage power source.

8. The overvoltage clamping circuit of claim 1 wherein said direct current power source means includes a pair of opposite polarity voltage sources having a common reference and comprising a voltage monitoring network connected directly across both power sources and having a set point adjustment means for selecting a portion of the voltage, said comparator including a unilateral three terminal switch having input and output terminals and a compensating terminal, said input terminal being connected to said network and said output terminal being connected to said triggering circuit means, said unilateral switch being responsive to a selected voltage difference at said terminals to conduct and establish a voltage signal at said control terminal said power switch including a pair of conducting means connected across each of said voltage sources and having a gate means connected to said triggering circuit means for simultaneous actuation.

9. The clamping circuit of claim 8 having a controlled rectifier ampliifer connected between said voltage sources and including a controlled rectifier in series with a diode and a resistor, said controlled rectifier amplifier having a gate connected to said control terminal of said unilateral switch to turn on said controlled rectifier amplifier in response to triggering of the unilateral switch, a first voltage dividing network connected between the output of the trigger controlled rectifier and the one voltage source, a second trigger voltage dividing network connected between the side of the diode and the common reference ground, said pair of conducting means including first and second power controlled rectifiers connected one each across said pair of voltage sources and having gates connected respectively one each to the voltage dividing networks to provide essentially simultaneous firing of the power controlled rectifiers in response to conduction through the controlled rectifier amplifier to thereby establish corresponding essentially short circuiting clamps across each of the sources.

10. The overvoltage clamping circuit of claim 8 having an amplifier connected to said power sources and having an input means connected to said control terminal of said unilateral switch to turn on said amplifier in response to triggering of the unilateral switch, and connecting means connecting the output of the amplifier to said gate means of said pair of conducting means.

11. The overvoltage clamping circuit of claim 10 wherein said connecting means includes a first voltage dividing network connected between the output of the amplifier and the one voltage source, a second voltage dividing network connected between the amplifier and the common reference ground, said conducting means having first and second gates connected respectively one each to the voltage dividing networks to provide essentially simultaneous conduction in response to conduction through the amplifier to thereby establish corresponding essentially short circuiting clamps across each of the sources.

12. A dual overvoltage crowbar circuit for protecting of a pair of opposite polarity voltage sources having a common reference and each of which includes an individual current limiting means, comprising a voltage monitoring or sensing network connected directly across both power supplies and having an intermediate set point adjustment tap means for selecting a portion of the voltage between the tap and the respective power sources, a unilateral three terminal switch having input and output terminals and a compensating terminal, said input terminal being connected to said tap and said compensating terminal being connected to one of the power sources, said unilateral switch being responsive to a selected voltage different at said input and output terminals to conduct and establish a voltage signal at said output terminal, a controlled rectifier amplifier connected between said power supplies and including a controlled rectifier in series with a diode and a resistor, said controlled rectifier amplifier having a gate connected to said output terminal to turn on said controlled rectifier amplifier in response to triggering of the unilateral switch, a first voltage dividing network connected between the output of the trigger controlled rectifier and the one power supply, a second trigger voltage dividing network connected between the output side of the diode and the common reference ground, first and second power controlled rectifiers connected one each across said pair of voltage sources and having gates connected respectively one each to the voltage dividing networks to provide essentially simultaneous firing of the power controlled rectifiers in response to conduction through the controlled rectifier amplifier to thereby establish corresponding essentially short circuiting clamps across each of the sources.

* * * * *